Figure 1:
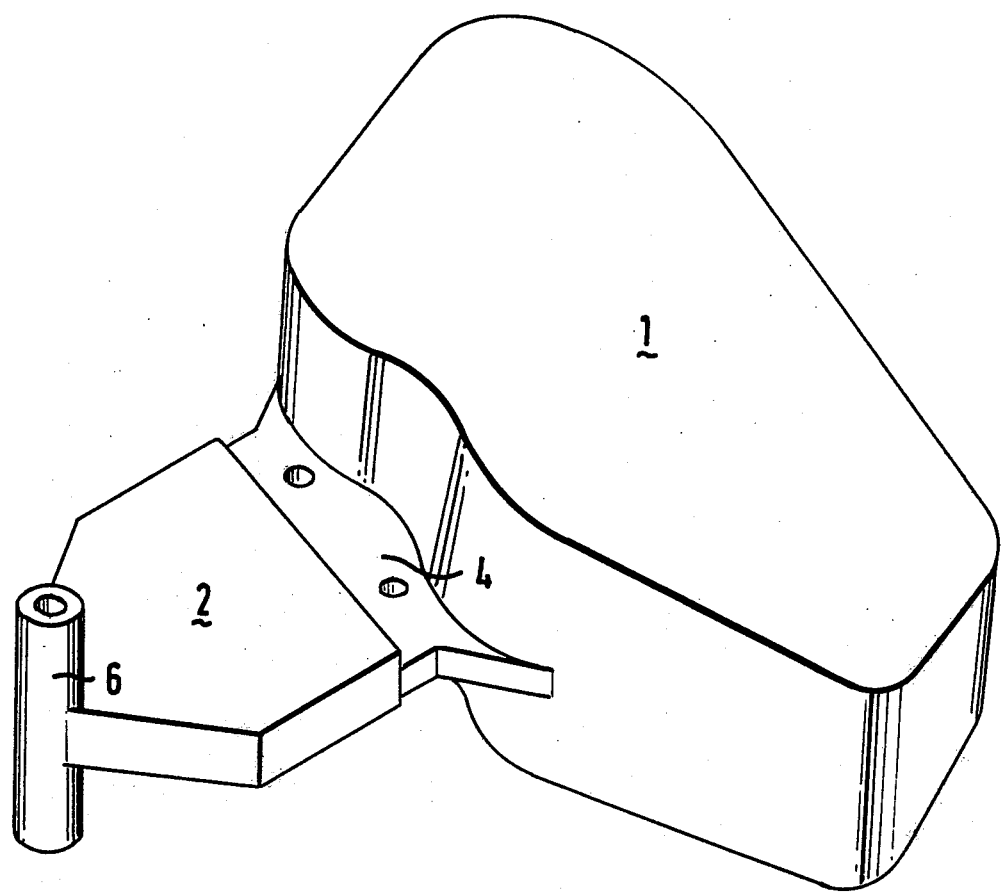

United States Patent [19]

Jackman

[11] 4,160,381
[45] Jul. 10, 1979

[54] FLOATS AND METHOD FOR MAKING SAME

[75] Inventor: Anthony D. Jackman, Woking, England

[73] Assignee: Bettix Limited, Surrey, England

[21] Appl. No.: 849,421

[22] Filed: Nov. 7, 1977

[51] Int. Cl.² .................................................. G01F 23/06
[52] U.S. Cl. ................................. 73/322.5; 264/524; 264/273
[58] Field of Search ................................. 73/305–317, 73/322.5; 137/434, 426, 423; 261/70; 264/273, 94, 97, 98; 4/394

[56] References Cited

U.S. PATENT DOCUMENTS

| 3,059,661 | 10/1962 | Benmore | 73/322.5 X |
| 3,291,670 | 12/1966 | Usab | 264/98 |
| 3,511,265 | 5/1970 | Martin | 137/434 |
| 3,531,767 | 9/1970 | Klein et al. | 73/308 X |
| 3,886,645 | 6/1975 | Schurman | 264/98 X |

*Primary Examiner*—Charles Gorenstein
*Attorney, Agent, or Firm*—Larson, Taylor and Hinds

[57] ABSTRACT

A float for the control of liquid level, and method of making same comprising one or more blow moulded float bodies, each with an integral compression moulded tag, and an injection moulded mounting or bridge secured to the or each tag and shaped to support the float in a carburettor or other reservoir.

6 Claims, 3 Drawing Figures

FLOATS AND METHOD FOR MAKING SAME

The invention relates to carburettor and other precision-moulded floats.

It is known to make twin carburettor floats, joined by a bridge which is used to mount the float in the carburettor, by a combined process of blow and compression moulding. The plastic used is blown to form a parison, which is then compressed between the two halves of a die to form two float bodies and, by pressing parts of the parison together, the bridge joining them. Several complete floats are moulded at a time, joined by a very thin web to a surrounding frame of excess material which is recycled after breaking out the floats.

This process gives float bodies of good accuracy, containing under raised pressure the gas originally used to inflate the parison. The bridge however is sometimes found not to be dimensionally stable, a fault believed to be due to residual stresses in the material, particularly where the two sides of the parison met. Further, any recesses or the like required for mounting hinges or other parts to locate the float in the carburettor can in practice only be moulded perpendicular to the joining plane of the mould. Also the flash left in the joining plane may interfere with accurate mounting.

In order to overcome these problems we have had the idea of combining blow, compression and injection moulding to produce the floats.

According to the method and article of the present invention a carburettor or other precision moulded float for control of liquid level is made of forming one or more float bodies from a blow moulded parison by compressing the parison in a mould to give the float bodies and, attached to the or each such body, a compression-moulded tag optionally having one or more mechanical keying formations, and subsequently placing the desired number of float bodies in an injection moulding die and injecting material to form a mounting or bridge secured to the tag of the or each float body. Mounting recesses or the like for use of the float may be moulded in as required.

General engineering plastics may be used for the floats and the mountings, conveniently acetals, provided they are resistant to the petrol or other liquid with which the float is to be used. Higher grades of plastics may be used for the mounting of bridge than for the floats, or if required different plastic altogether, to ensure dimensional stability.

Careful selection of the plastics and the injection moulding conditions may enable a mechanical key to be supplemented or even replaced by bonding or fusion of the materials allowing a plain tag to be used.

The invention extends also to the floats themselves, comprising one or more blow-moulded float bodies each with an integral compression-moulded tag, and an injection moulded mounting or bridge secured to the or each tag and shaped to support the float in a carburettor or other reservoir.

Figure 2:
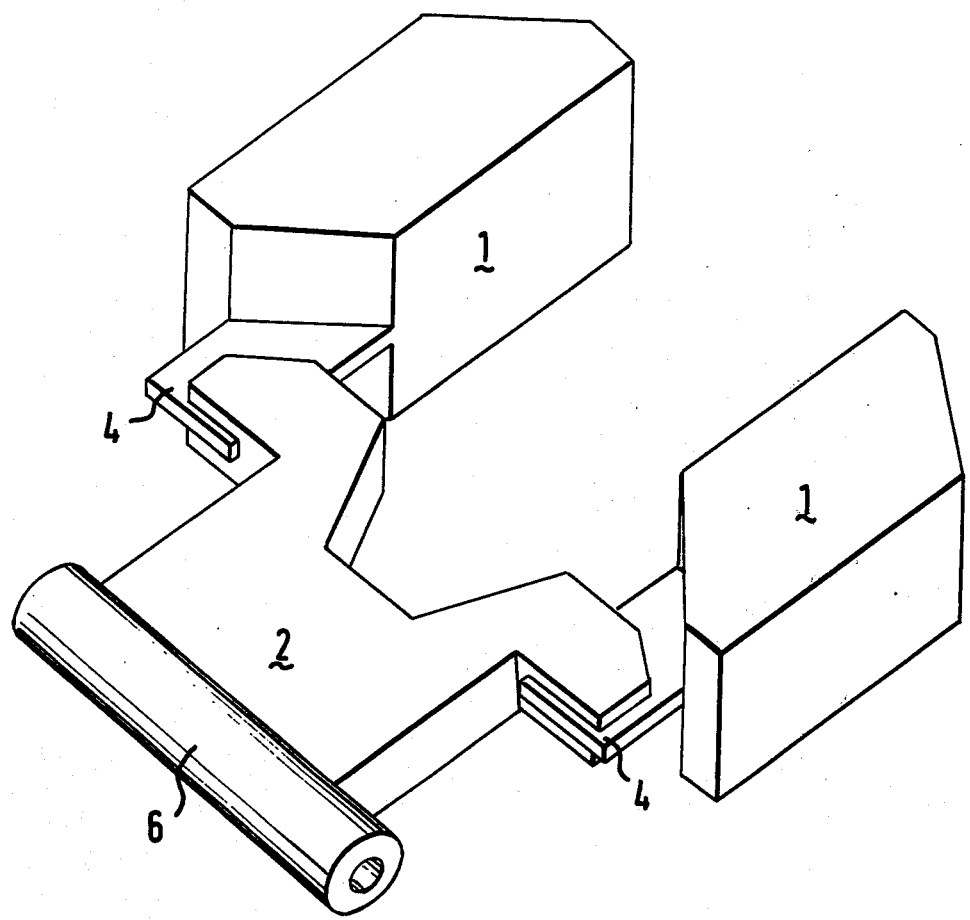
Figure 3:
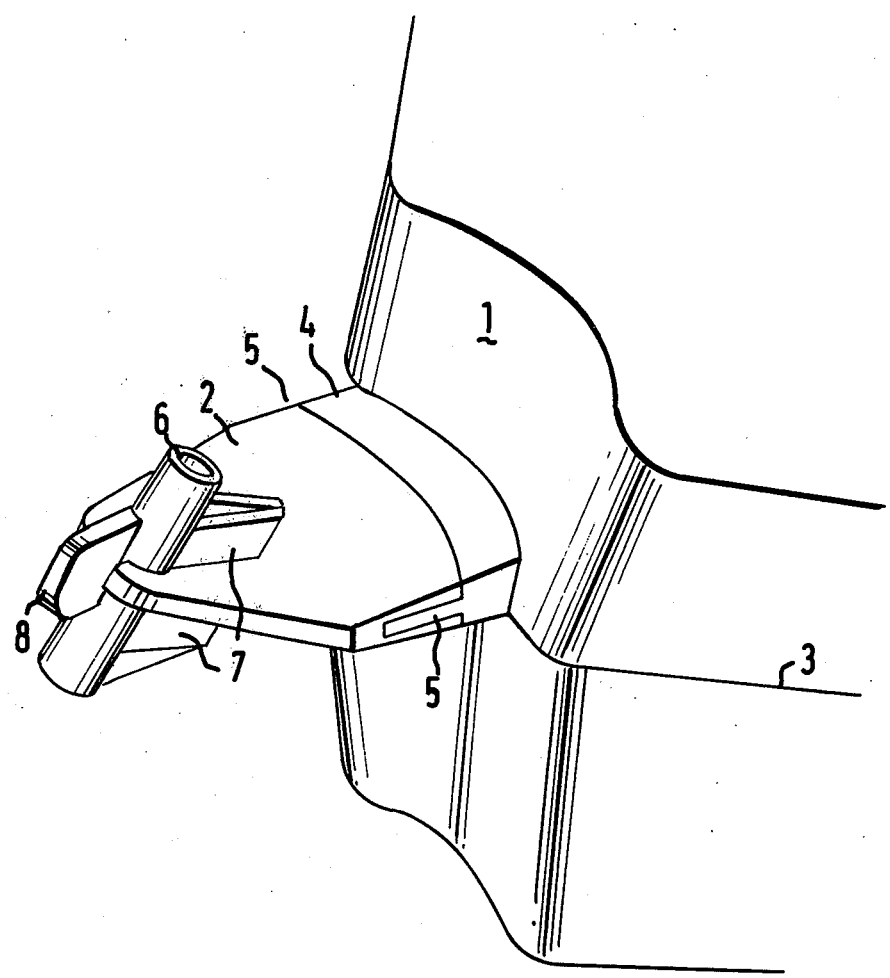

The invention is illustrated by the following examples of floats, reference being made to the accompanying drawings in which:

FIG. 1 shows a complete, single float;
FIG. 2 shows a complete double float; and
FIG. 3 shows a detail of a further single float.

The floats are in acetal resin, and are made generally as already described above. The float bodies 1 are moulded in groups of six by compression of a blow-moulded parison, the parting line of the mould being indicated for example at 3 on FIG. 3, and tags 4 being formed at the compression stage. Keying holes are moulded in the tags, but are not seen in the drawings, being within the mountings 2.

When the floats as such have been made they are transferred to an injection moulding machine, held by the tags, for example (FIG. 3) by the parallel sides 5. The mounting or bridge 2 is then accurately moulded into place, that of FIG. 3 for example having a spindle housing 6 (also so referenced in FIGS. 1 and 2), strengthening webs 7 and an operating tab 8. It is particularly to be noted that the spindle axis is in the float of FIG. 3 inclined, at 10°, from a perpendicular to the main part of the mounting enclosing the tag, and would be impossible to make by simple compression moulding.

What I claim is:

1. A float for the control of liquid level, comprising one or more blow moulded float bodies, each with an integral compression moulded tag, and an injection moulded mounting or bridge having a structure and an integral interconnection to one or more tags characterized by its having been moulded directly and integrally during its formation in the injection mold to the said one or more tags and shaped to support the float in a carburettor or other reservoir.

2. A float according to claim 1, the float body or bodies having been made from a single blow moulded parison by compressing it in a mould to form the bodies for one or more floats complete with their tags, and the mounting or bridge for the body or bodies having been made in an injection moulding die containing the required number of body or bodies held in position.

3. A method of making a float for the control of a liquid level comprising the steps of:
   blow moulding a float body in the shape of the float including compression moulding an integral tag extending outwardly from the body of the float;
   attaching the moulded float body to an injection moulding machine with the tag located within the injection mould cavity, and
   injecting material into the injection mould to form a mounting or bridge directly, integrally secured to the tag and shaped to support the float in a carburettor or other reservoir.

4. The method of claim 3, wherein the step of blow moulding includes initially blowing a parison into generally the shape of the float body, and they by said compression moulding, compressing that body to form the final shape of the float body with its tag.

5. The method of claim 4 wherein the blow mould comprises a plurality of cavities, one for each float body, and the step of blow moulding includes blowing a single parison which extends through all of said blow moulding cavities and then compressing all of said blow moulding cavities to form separate float bodies, each with its said tag attached thereto.

6. The method of claim 5, wherein the injection moulding step includes attaching all of said float bodies to the injection moulding machine which has a separate mounting or bridge cavity for each float body, and then injection moulding all of the mountings or bridges for all of the bodies.

* * * * *